(12) United States Patent
Shih et al.

(10) Patent No.: US 7,997,867 B1
(45) Date of Patent: Aug. 16, 2011

(54) MOMENTUM PRESERVING FILM-COOLING SHAPED HOLES

(75) Inventors: Tom I-P Shih, Ames, IA (US); Sangkwon Na, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 972 days.

(21) Appl. No.: 11/975,064

(22) Filed: Oct. 17, 2007

Related U.S. Application Data

(60) Provisional application No. 60/829,712, filed on Oct. 17, 2006.

(51) Int. Cl.
F01D 5/08 (2006.01)
(52) U.S. Cl. ...................... 416/97 R; 415/115
(58) Field of Classification Search ................. 415/115; 416/97 R
See application file for complete search history.

(56) References Cited

U.S. PATENT DOCUMENTS

| | | | | |
|---|---|---|---|---|
| 4,676,719 A * | 6/1987 | Auxier et al. | | 416/97 R |
| 4,684,323 A * | 8/1987 | Field | | 416/97 R |
| 4,738,588 A * | 4/1988 | Field | | 416/97 R |
| 4,773,593 A | 9/1988 | Auxier et al. | | |
| 4,992,025 A * | 2/1991 | Stroud et al. | | 416/97 R |
| 5,419,681 A * | 5/1995 | Lee | | 416/97 R |
| 5,498,133 A | 3/1996 | Lee | | |
| 5,624,231 A * | 4/1997 | Ohtomo et al. | | 416/97 R |
| 5,747,769 A * | 5/1998 | Rockstroh et al. | | 416/97 R |
| 6,099,253 A | 8/2000 | Fukue et al. | | |
| 6,234,755 B1 * | 5/2001 | Bunker et al. | | 416/97 R |
| 6,241,468 B1 * | 6/2001 | Lock et al. | | 415/115 |
| 6,979,176 B2 * | 12/2005 | Nakamata et al. | | 416/97 R |
| 7,056,093 B2 | 6/2006 | Self et al. | | |
| 7,182,576 B2 | 2/2007 | Bunker et al. | | |
| 7,207,775 B2 | 4/2007 | Muriithi | | |
| 7,789,625 B2 * | 9/2010 | Liang | | 416/97 R |
| 2005/0118023 A1 | 6/2005 | Bunker et al. | | |
| 2005/0220618 A1 | 10/2005 | Zhang et al. | | |
| 2005/0286998 A1 * | 12/2005 | Lee et al. | | 415/117 |

OTHER PUBLICATIONS

George, Tom J. et al., "Effects of Partial Blockage of Film Cooling Holes and Deposits on Film Cooling Effectiveness and Heat Transfer", SCIES Project 04-01-SR115, Aug. 1, 2004, 35 pages.

Na, S. et al., "Increasing Adiabatic Film-Cooling Effectiveness by Using an Upstream Ramp", GT-2006-91163, 53rd ASME Gas Turbine and Aeroengine Technical Congress, Exposition, and User Symposium, May 8-11, 2006, pp. 1-8.

(Continued)

Primary Examiner — Igor Kershteyn
(74) Attorney, Agent, or Firm — McKee, Voorhees & Sease, P.L.C.

(57) ABSTRACT

A system for cooling includes a surface to be cooled and at least one film-cooling hole within the surface for allowing a film cooling jet of coolant to reach the surface, each of the at least one film-cooling hole having a diameter. The at least one film-cooling hole is shaped to preserve momentum of the coolant and assist in preventing entrainment of the hot gases. A method of cooling a surface proximate hot gas includes providing coolant through a w-shaped film-cooling hole to form a cool film between the hot gas and the surface and preserving momentum of the coolant using the w-shaped film-cooling hole to assist in preventing entrainment of the hot gases.

18 Claims, 17 Drawing Sheets

OTHER PUBLICATIONS

Na, S. et al., "Increasing Film-Cooling Adiabatic Effectiveness by Using an Upstream Ramp", GT-2006-91163, 53rd ASME Gas Turbine and Aeroengine Technical Congress, Exposition, and User Symposium, May 8-11, 2006, pp. 1-7.

Shih, Tom et al., "Effects of Coating Blockage and Deposits on Film-Cooling Effectiveness and Heat Transfer", UTSR Peer Review Workshop III, Oct. 17-19, 2006, 30 pages.

Shih, Tom et al., "DoD-DoE-FAA-NASA Propulsion and Power Systems Alliance" Nov. 8, 2005, Turbine Life Center, 45 pages.

Shih, T. I-P et al., "Preventing Hot Gas Ingestion by Film-Cooling Jets via Flow-Aligned Blockers", 53rd ASME Gas Turbine and Aeroengine Technical Congresss, Exposition, and User Symposium, May 8-11, 2006, pp. 1-9.

Shih, T. I-P et al., "Momentum-Preserving Shaped Holes for Film Cooling" Proceedings of GT2007-27600 ASME Turbo Expo 2007: Power for Land, Sea and Air, May 14-17, 2007, pp. 1-7.

* cited by examiner

MOMENTUM PRESERVING FILM-COOLING SHAPED HOLES

CROSS-REFERENCE TO RELATED APPLICATIONS

This application claims priority to provisional application Ser. No. 60/829,712 filed Oct. 17, 2006, herein incorporated by reference in its entirety.

GRANT REFERENCE

This invention was partially funded by DOE Contract No. DE-FC26-02NT41431. The government may have certain rights in the invention.

BACKGROUND OF THE INVENTION

To increase thermal efficiency and specific thrust, advanced gas turbine stages are designed to operate at increasingly higher inlet temperatures. This increase is made possible by advances in materials such as super alloys and thermal-barrier coatings. There are still significant limitations to operating at high temperatures even when super alloys and thermal barrier coatings (TBCs) are used. Consider that a temperature of 3000° F. (1649 C) is desirable for turbine inlet temperatures associated with power generation and a temperature of 3500° F. (1927 C) is desirable for turbine inlet temperatures associated with aircraft. Yet super alloys typically are limited to about 1050-1200 C and TBCs are typically limited to about 140-170 degrees C. above the material they coat. Thus, to achieve the desired turbine inlet temperatures for improve gas-turbine efficiency and specific thrust/power increases better materials and/or better cooling are needed.

Various advances have been made in cooling technology such as advances in cooling technology such as internal, film, impingement, and other techniques. In film cooling there is convective heat transfer in holes. A layer of cooler air or film is formed to insulate hot gas from a metal or thermal barrier coated surface. However, one of the problems with using film cooling is that the film-cooling jets entrain the hot gases and then lift off the surfaces they are attempting to cool.

Thus, although the problems with cooling surfaces associated with gas turbines have been studied and various improvements proposed, problems remain. What is needed is a method for increasing coverage associated with film cooling by minimizing hot-gas entrainment with minimum cooling flow.

BRIEF SUMMARY OF THE INVENTION

Therefore, it is a primary object, feature, or advantage of the present invention to improve over the state of the art.

It is a further object, feature, or advantage of the present invention to provide a method and apparatus for cooling in a turbine system in an efficient manner.

Another object, feature, or advantage of the present invention is to minimize the entrainment of hot gases by the CRVs so that film-cooling effectiveness improves without unduly increasing surface heat transfer and pressure loss.

A further object, feature, or advantage of the present invention is to improve cooling by shaping the film-cooling hole.

A still further object, feature, or advantage of the present invention is to determine relationships between the mass flux rate and lift-off for a particular geometry of a film-cooling hole.

One or more of these and/or other objects, features, or advantages of the present invention will become apparent from the specification and claims that follow. The present invention is not to be limited by or to this summary of the invention.

According to one aspect of the present invention a system for cooling is provided. The system includes a surface to be cooled and at least one film-cooling hole within the surface for allowing a film cooling jet of coolant to reach the surface, each of the at least one film-cooling hole having a diameter. The at least one film-cooling hole is shaped to preserve momentum of the coolant and assist in preventing entrainment of the hot gases.

According to another aspect of the present invention an improvement to a gas turbine having a surface proximate hot gas is provided. The improvement includes at least one film-cooling hole providing access for a film cooling jet of coolant to reach the surface to thereby form a cool film between the hot gas and the surface. Each of the at least one film-cooling hole is shaped to preserve momentum of the coolant and assist in preventing entrainment of the hot gases.

According to yet another aspect of the present invention, a method of cooling a surface proximate hot gas is provided. The method includes providing coolant through a w-shaped film-cooling hole to form a cool film between the hot gas and the surface and preserving momentum of the coolant using the w-shaped film-cooling hole to assist in preventing entrainment of the hot gases.

DETAILED DESCRIPTION OF THE PREFERRED EMBODIMENT

Figure 1:
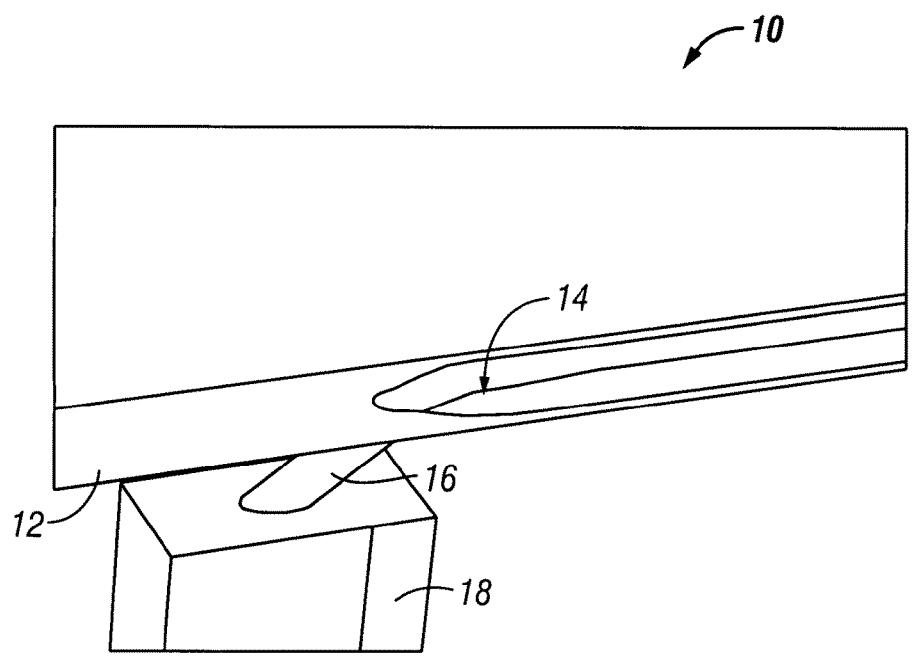
FIG. 1 is a perspective view of one embodiment of a w-shaped hole.

The present invention uses momentum preserving holes to minimize the entrainment of hot gases by the CRVs so that film-cooling effectiveness improves. A system for a surface to be cooled is shown in FIG. 1. The system 10 has a surface 12 to be cooled. There is a film-cooling hole 14 within the surface 12 which allows a film cooling jet of coolant to reach the surface 12. The film-cooling hole 14 has a diameter. The film-cooling hole is shaped to preserve momentum of the coolant and assist in preventing entrainment of the hot gases. The hole 14 is operatively connected through conduit 16 to a plenum 18. The conduit 16 may be considered as a part of the hole. The surface 12 may be any number of surfaces associated with a turbine where high temperature gases are of concern.

Figure 2:
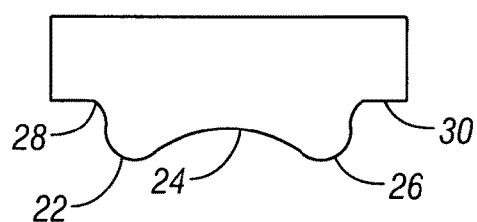
FIG. 2 is a cross section view of the w-shaped hole of FIG. 1.

FIG. 2 illustrates a cross-section of one embodiment of a w-shaped hole. A central point 24 is shown from which the hole curves downwardly and outwardly deepening portions on opposite bottom ends 22, 26 of the groove. The hole then curves upward to opposite ends 28, 30 thereby forming a w-shaped cross-section. Note that in the hole of FIG. 2, the opposite ends 28, 30 are above the central point 24.

Figure 3:
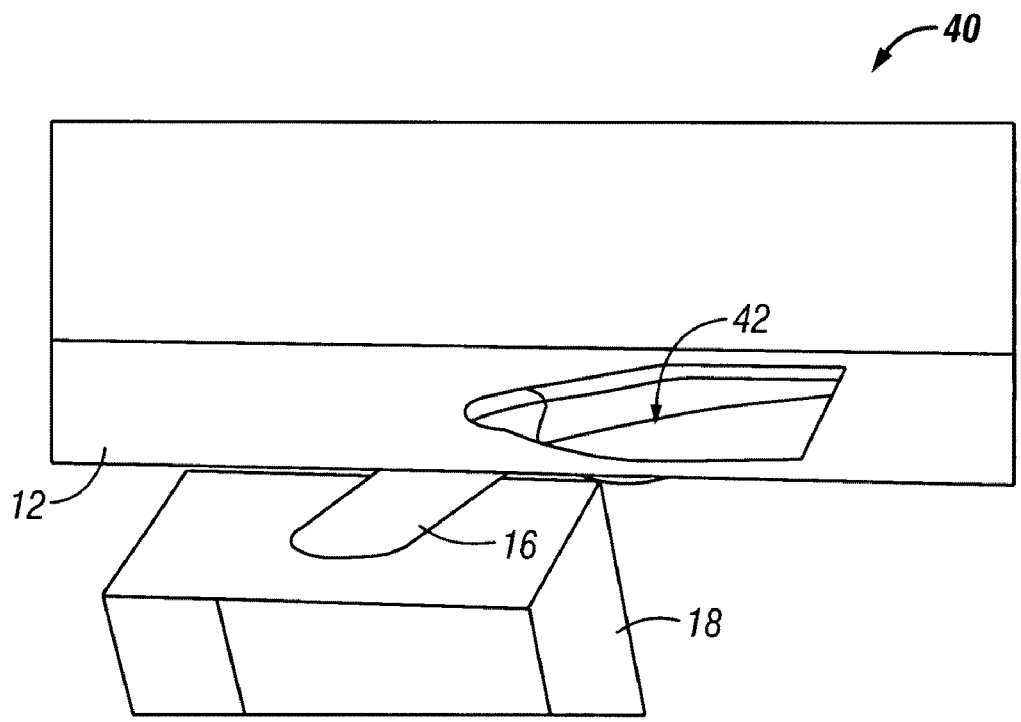
FIG. 3 is a perspective view of another embodiment of a w-shaped hole.

FIG. 3 illustrates another embodiment of a system having a surface to be cooled with a different shaped film-cooling hole. The system 40 has a surface 12 to be cooled. There is a film-cooling hole 42 within the surface 12 which allows a film cooling jet of coolant to reach the surface 12. The film-cooling hole 42 has a diameter. The film-cooling hole 42 is shaped to preserve momentum of the coolant and assist in preventing entrainment of the hot gases. The hole 42 is operatively connected through conduit 16 to a plenum 18. The conduit 16 may be considered to be a part of the hole. The surface 12 may be any number of surfaces associated with a turbine where high temperature gases are of concern.

Figure 4:
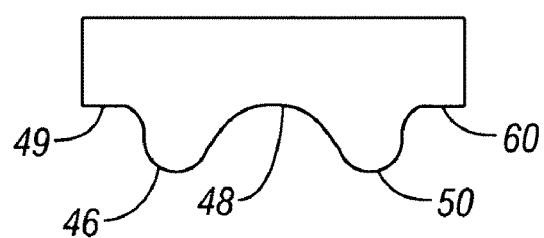
FIG. 4 is a cross section view of the w-shaped hole of FIG. 2.

FIG. 4 illustrates a cross-section of one embodiment of a w-shaped hole. A central point 48 is shown from which the hole curves downwardly and outwardly deepening portions on opposite bottom ends 46, 50 of the groove. The hole then curves upward to opposite ends 49, 60 thereby forming a w-shaped cross-section. Note that in the hole of FIG. 3, the opposite ends 49, 60 are at and not above the central point 48. The height of such a hole may be considered to be 0.

Figure 5:
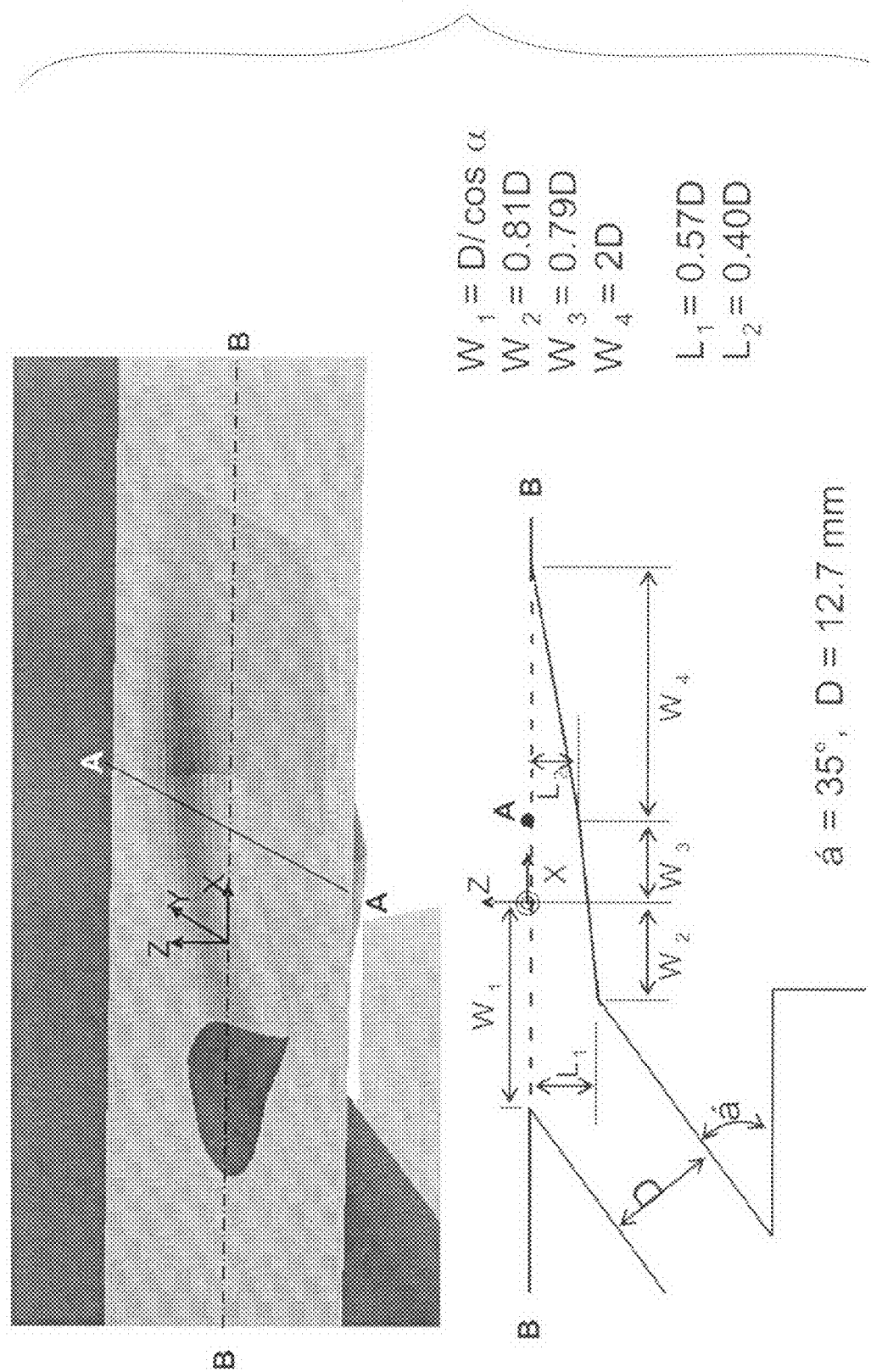
FIG. 5 provides a view of short groove w-shaped hole embodiment.
Figure 6:
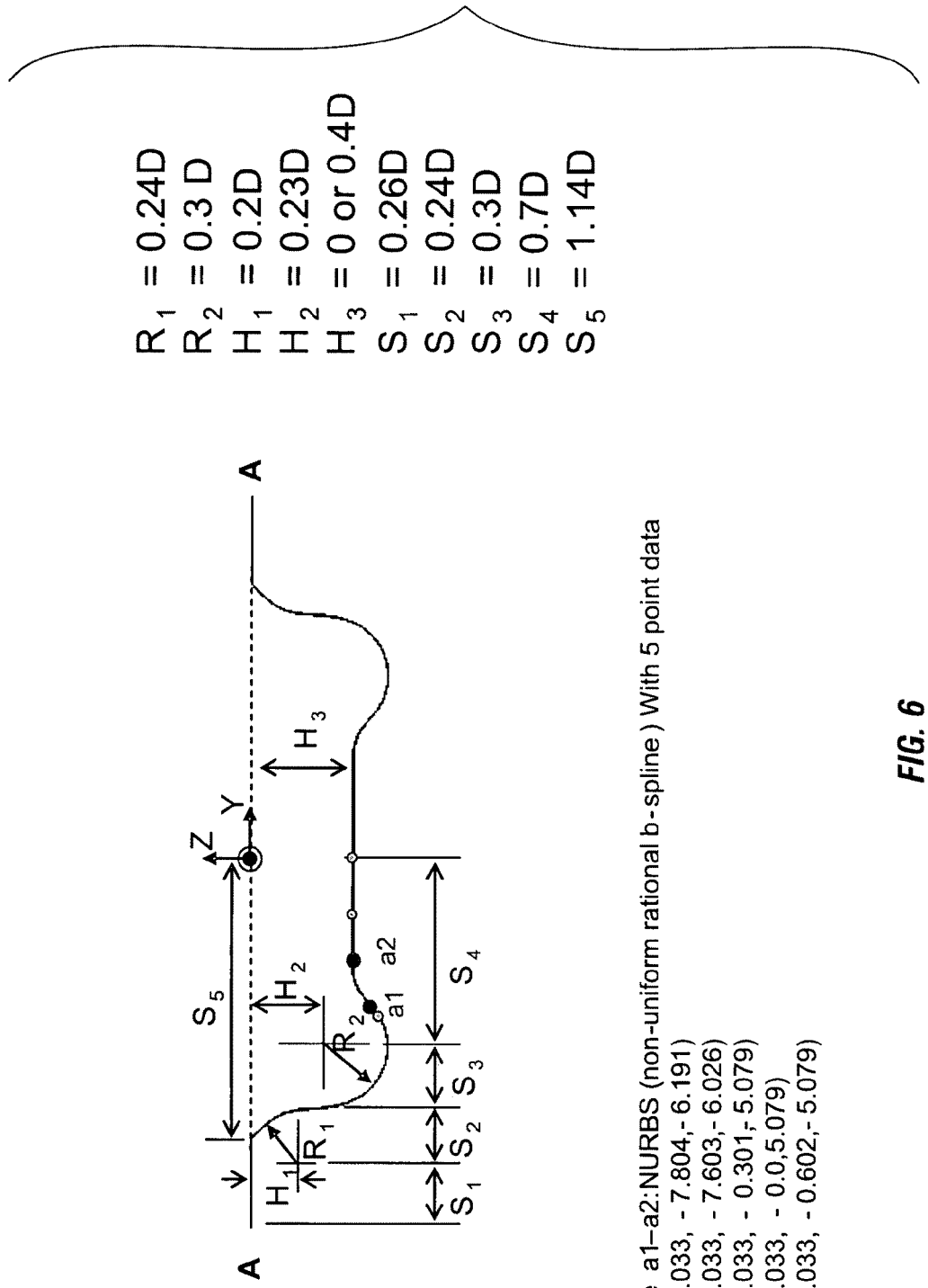
FIG. 6 provides dimensions associated with one embodiment of the short groove w-shaped hole.
Figure 7:
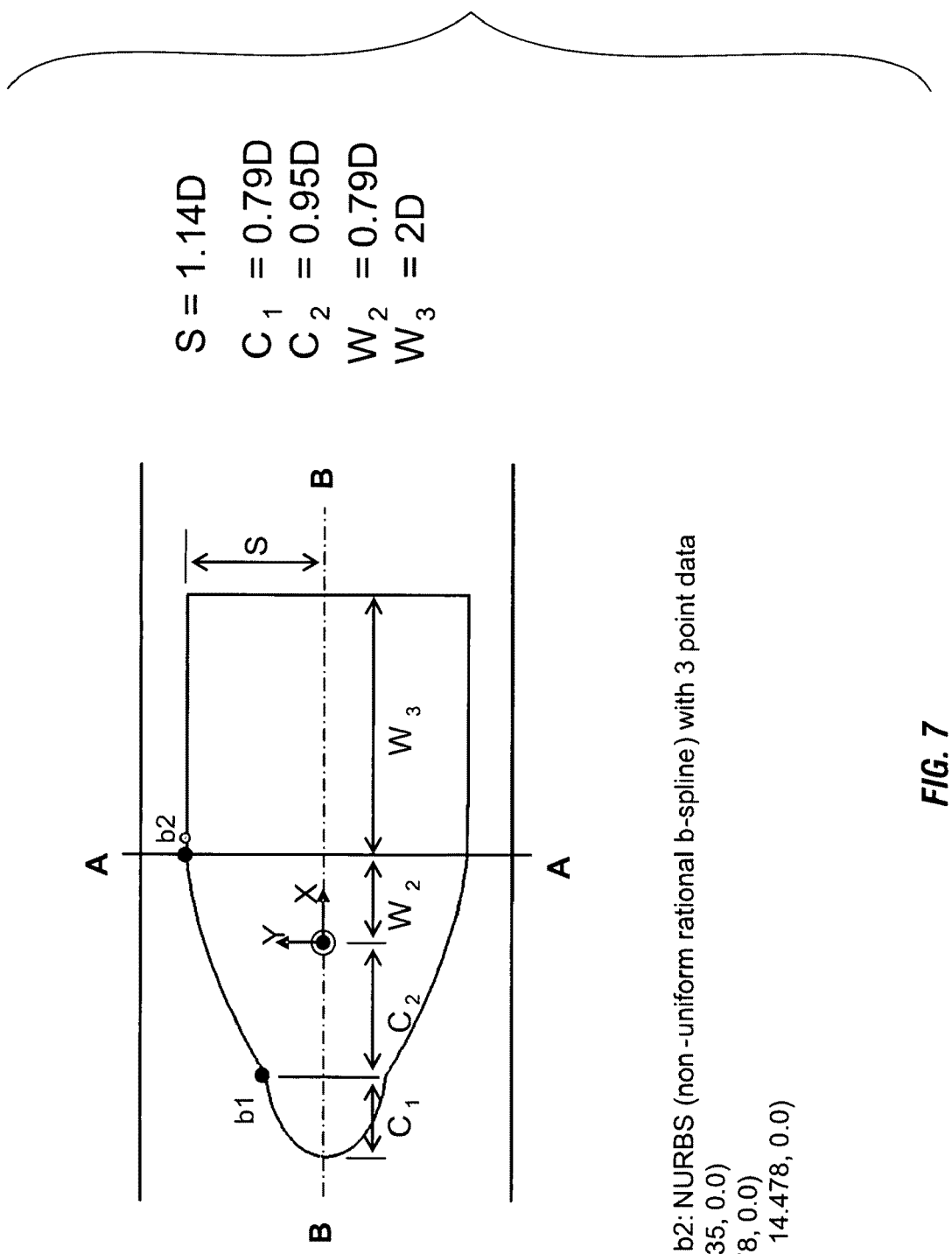
FIG. 7 provides dimensions associated with one embodiment of a w-shaped hole.

FIGS. 5-7 provide additional details regarding the geometry of different embodiments of a w-shaped hole. The geometries of the holes are expressed relative to the diameter of the conduit which ends in the hole. The geometries are shown are merely illustrative and representative as the present invention contemplates that other geometries may be used.

Figure 8:
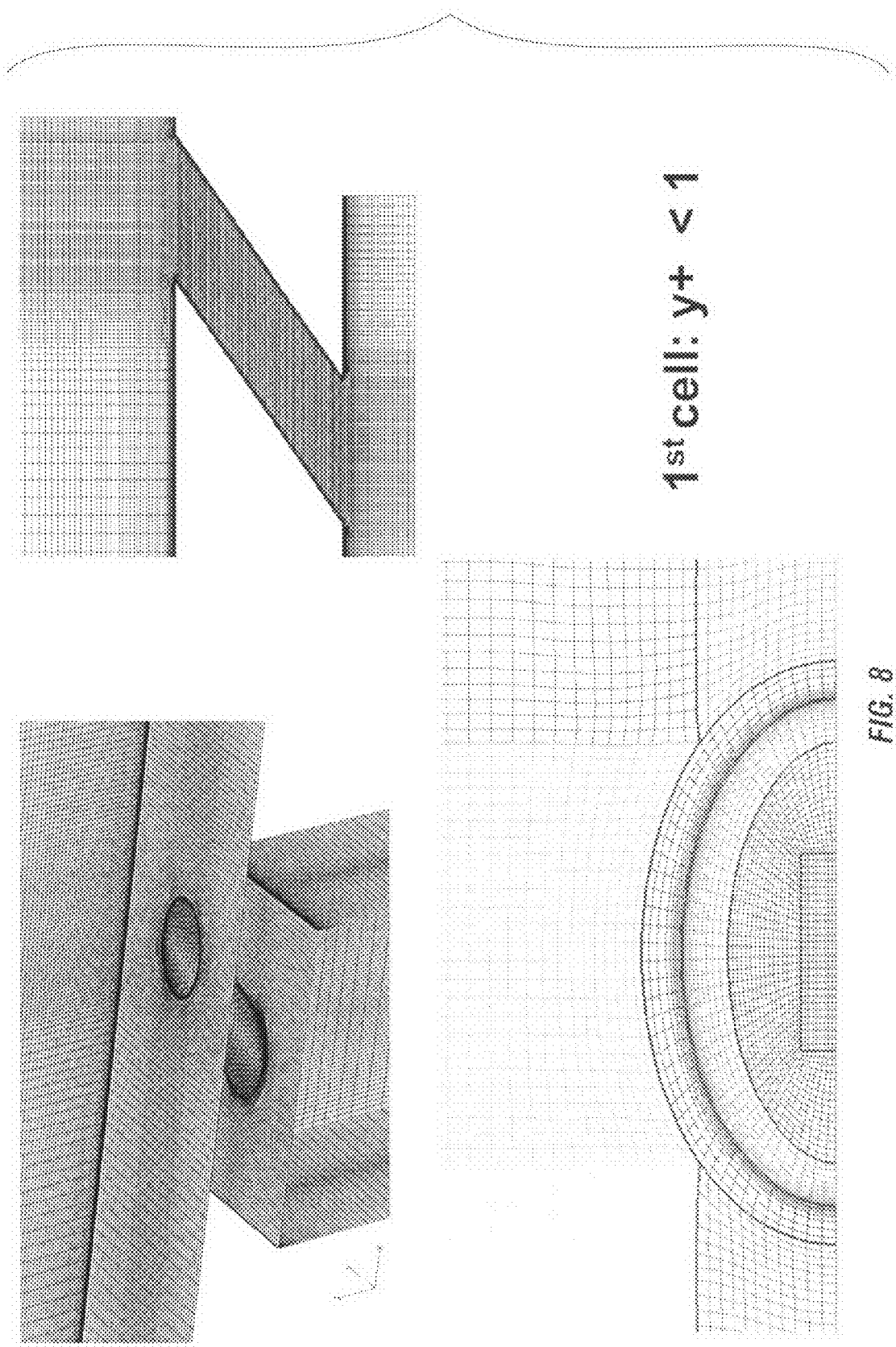
FIG. 8 describes a baseline problem of film-cooling of a plate for a grid study.

FIG. 8 illustrates a baseline case for a film-cooling hole of a flat plate where the hole does not have a momentum-preserving shape. In such a case, the film-cooling jets will entrain hot gases and lift off.

Figure 9:
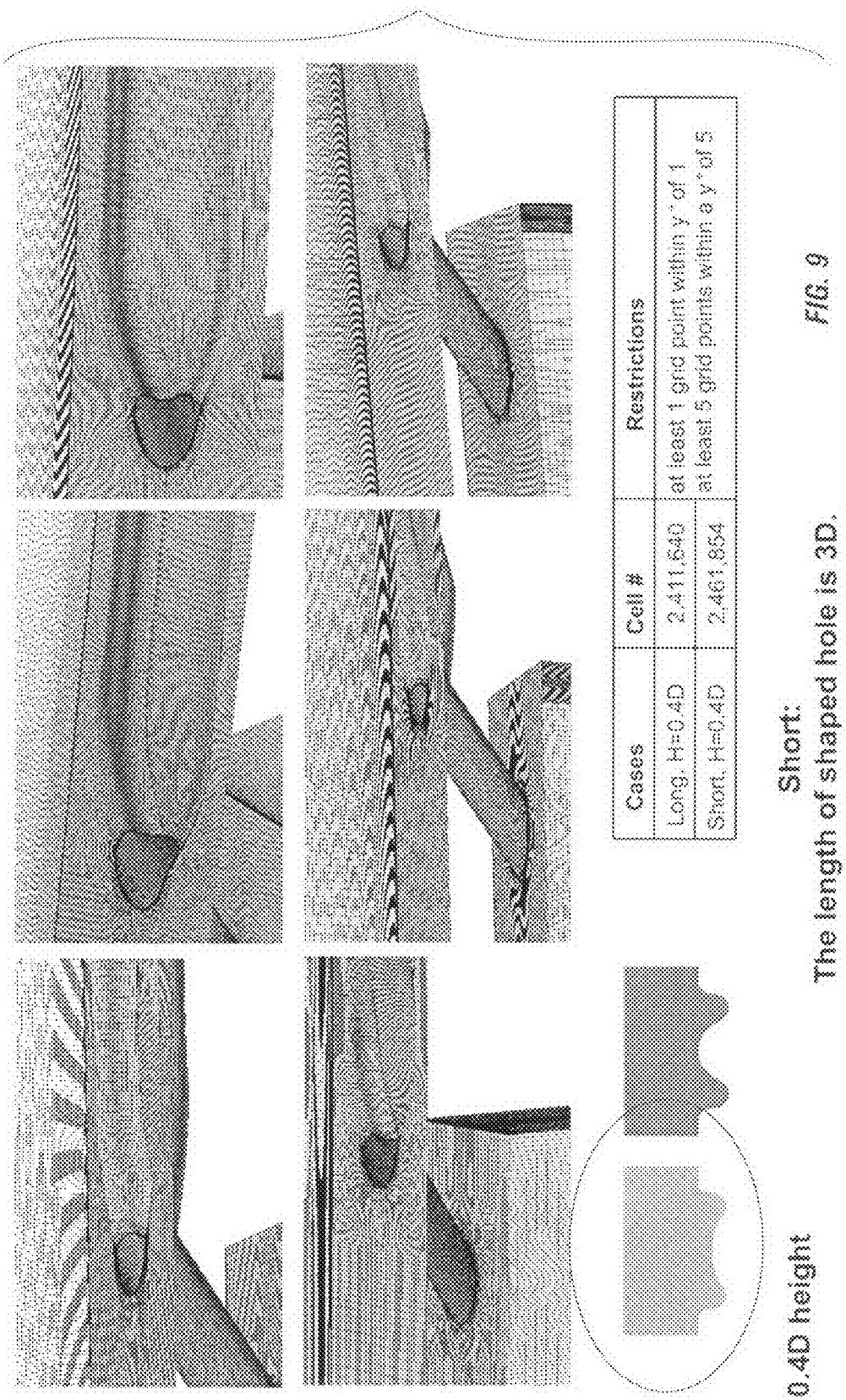
FIG. 9 describes a grid study of momentum-preserving w-shaped holes for an embodiment where the height of the hole is 0.4 times the diameter of the hole.
Figure 10:
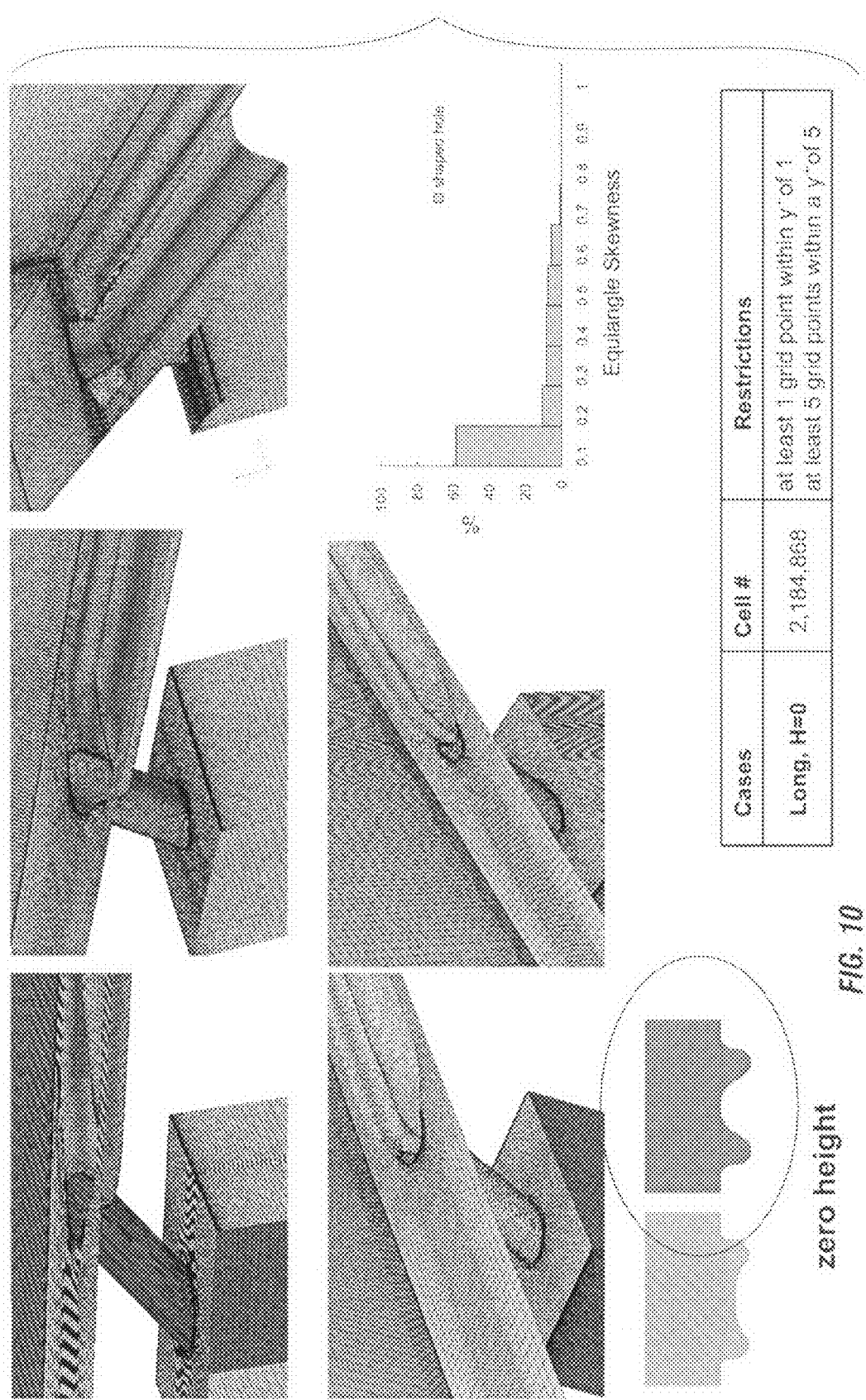
FIG. 10 describes a grid study of momentum-preserving w-shaped holes for a hole with zero height.
Figure 11:
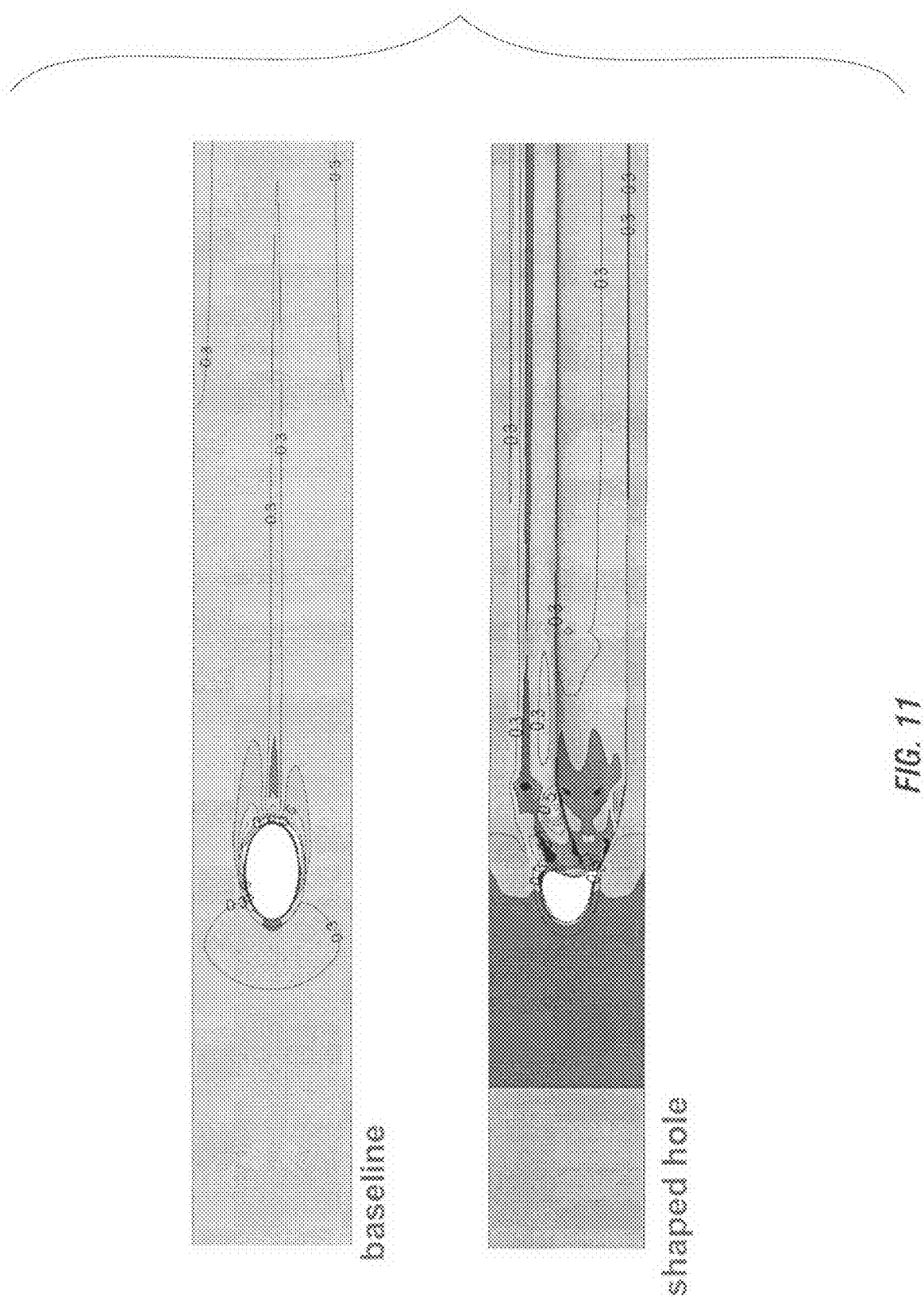
FIG. 11 compares the baseline problem with a shaped hole.

FIG. 9 describes a grid study of momentum-preserving w-shaped holes for an embodiment where the height of the hole is 0.4 times the diameter of the hole. FIG. 10 describes a grid study of momentum-preserving w-shaped holes for a hole with zero height. FIG. 11 illustrates grid y+ values for the baseline case and a shaped hole.

Figure 12:
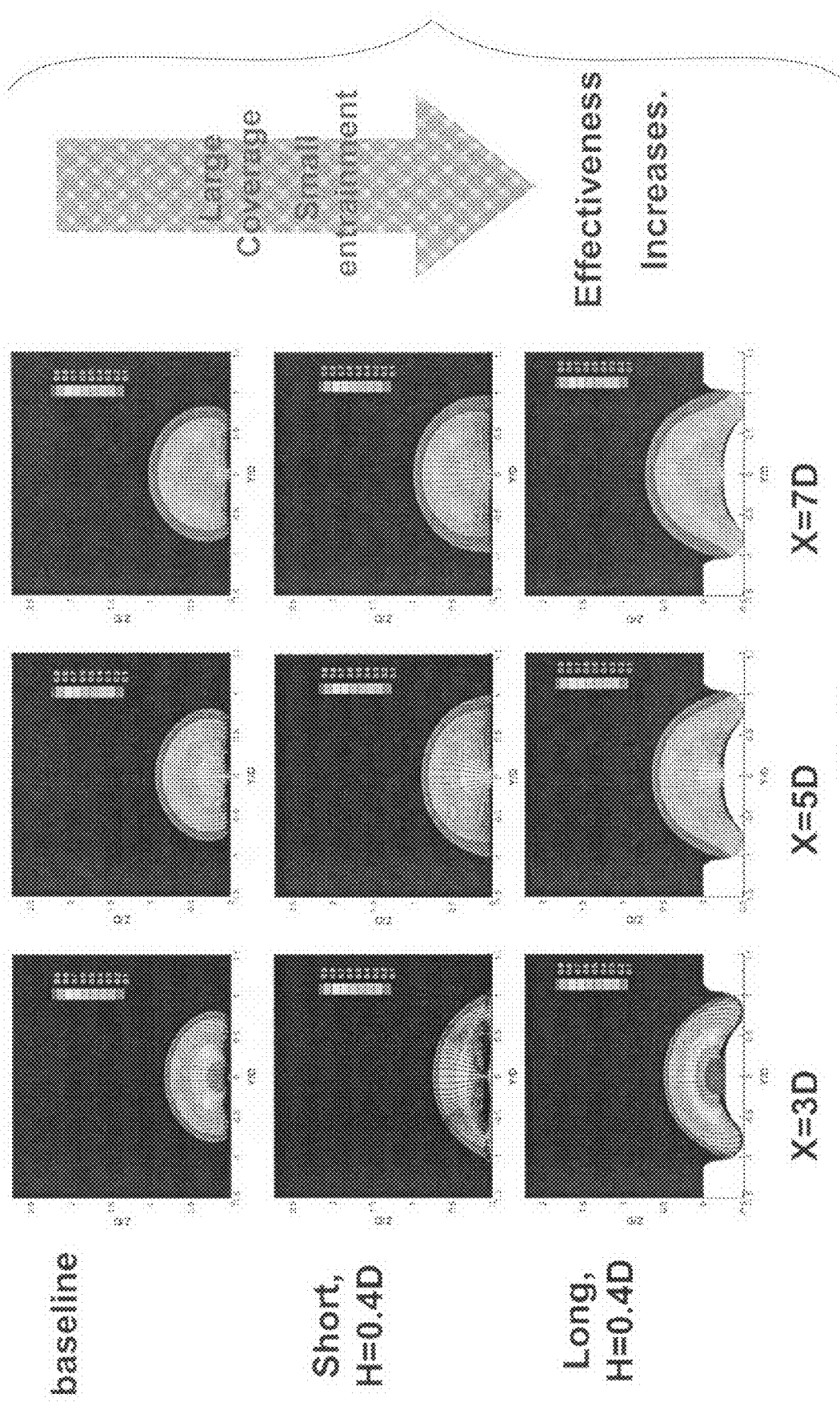
FIG. 12 provides a comparison between a baseline case, a short w-shaped hole, and a long w-shaped hole.
Figure 13:
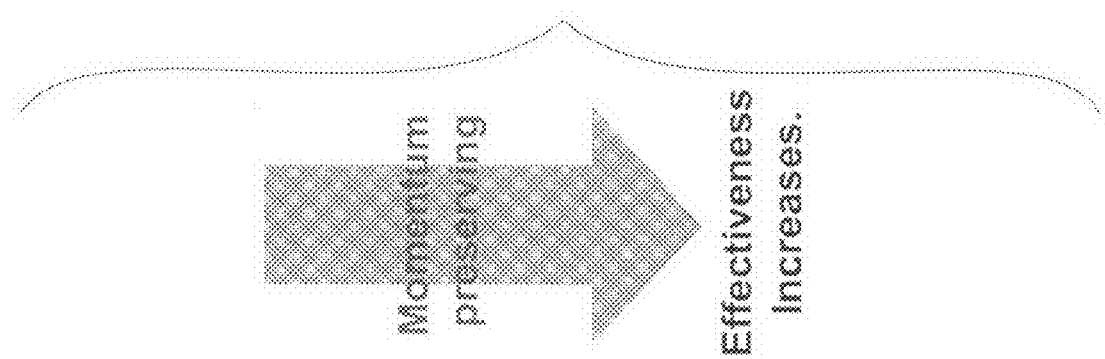
FIG. 13 provides a comparison between a long w-shaped hole having a height of 0.4D and a long w-shaped hole having a height of 0.
Figure 13:
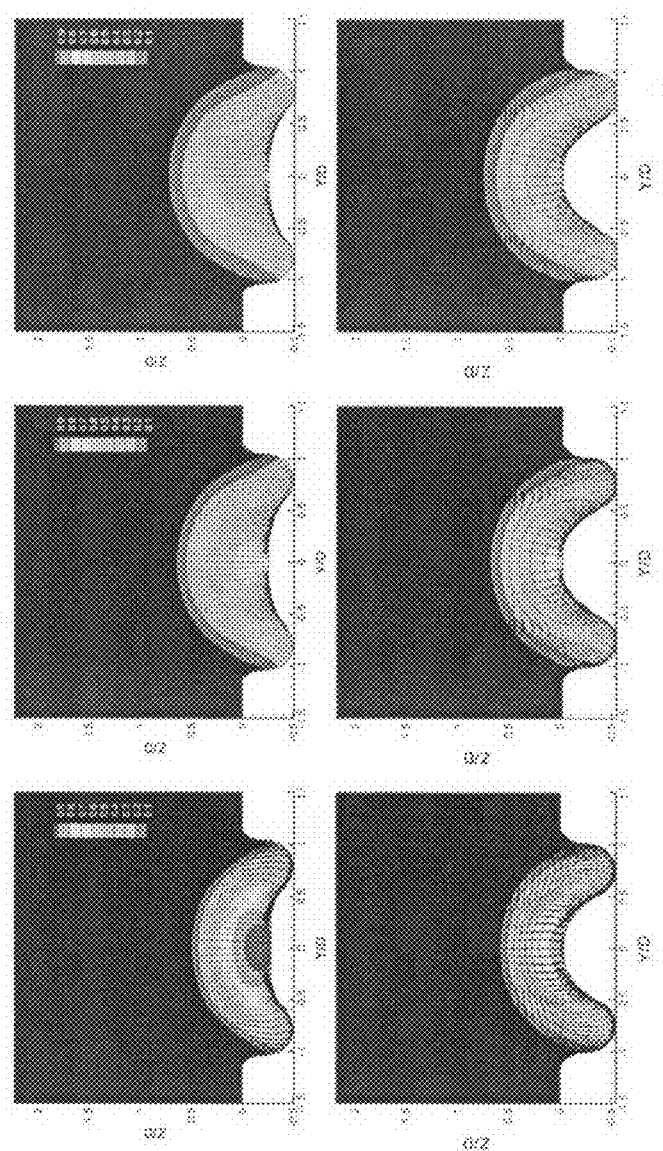
Figure 14:
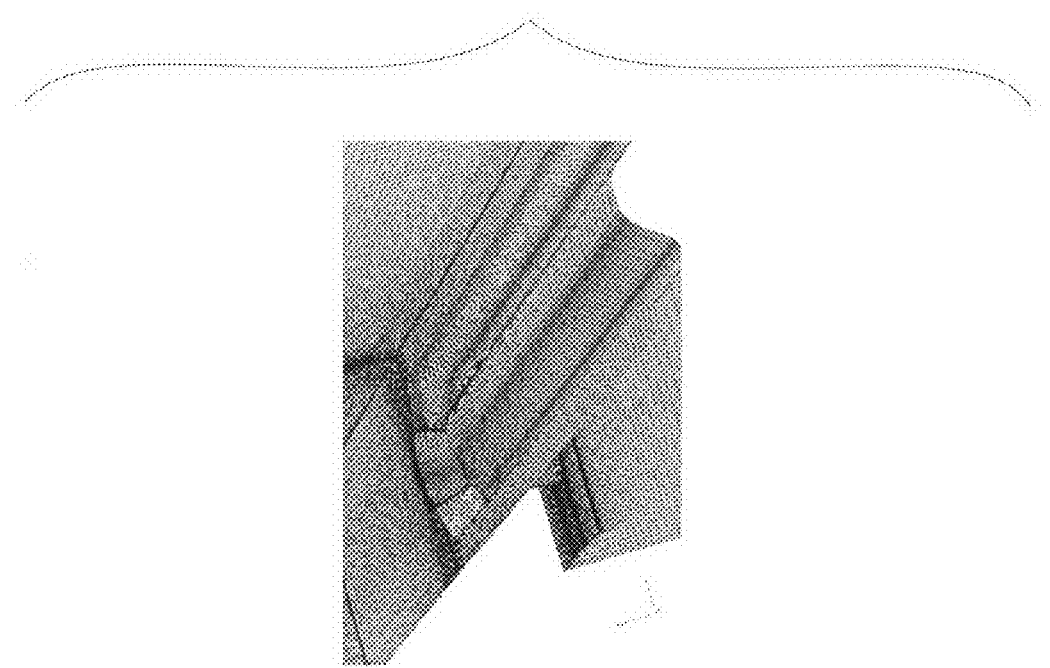
FIG. 14 provides for additional CFD predictions.
Figure 14:
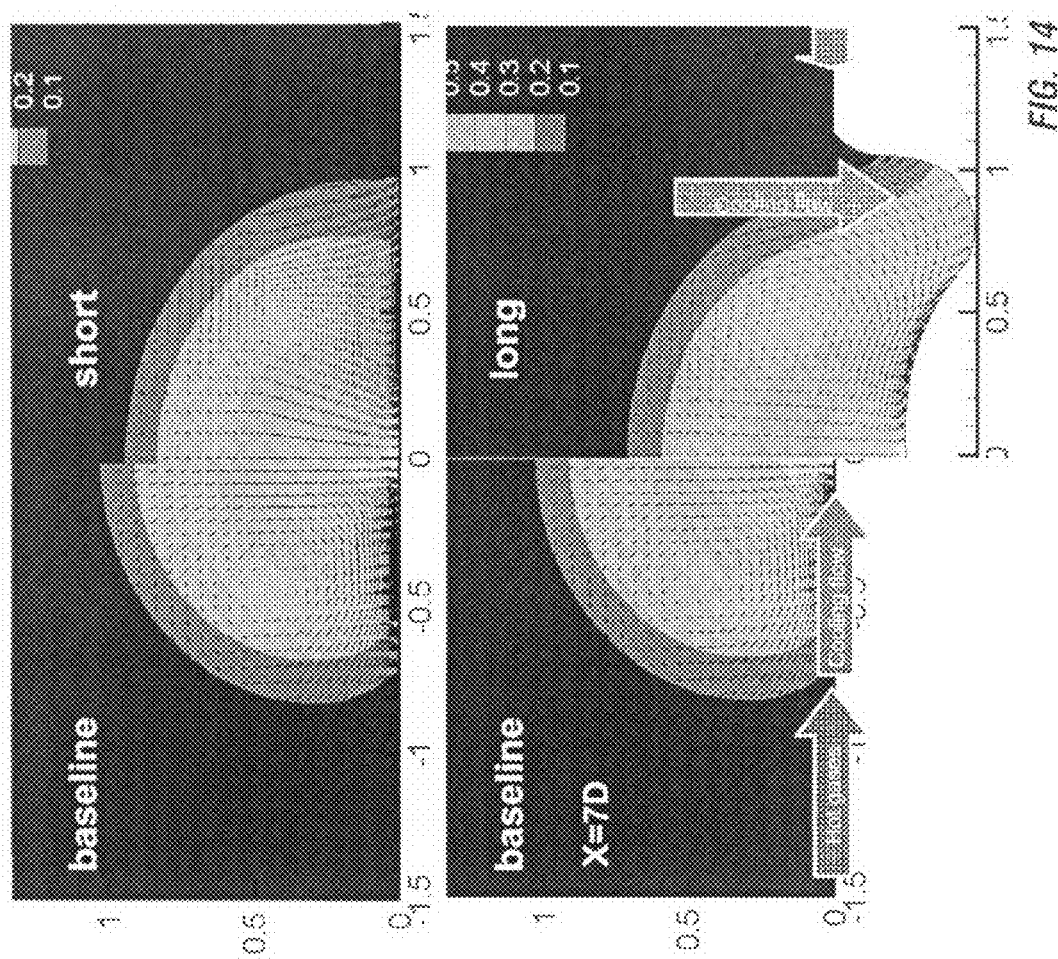
Figure 15:
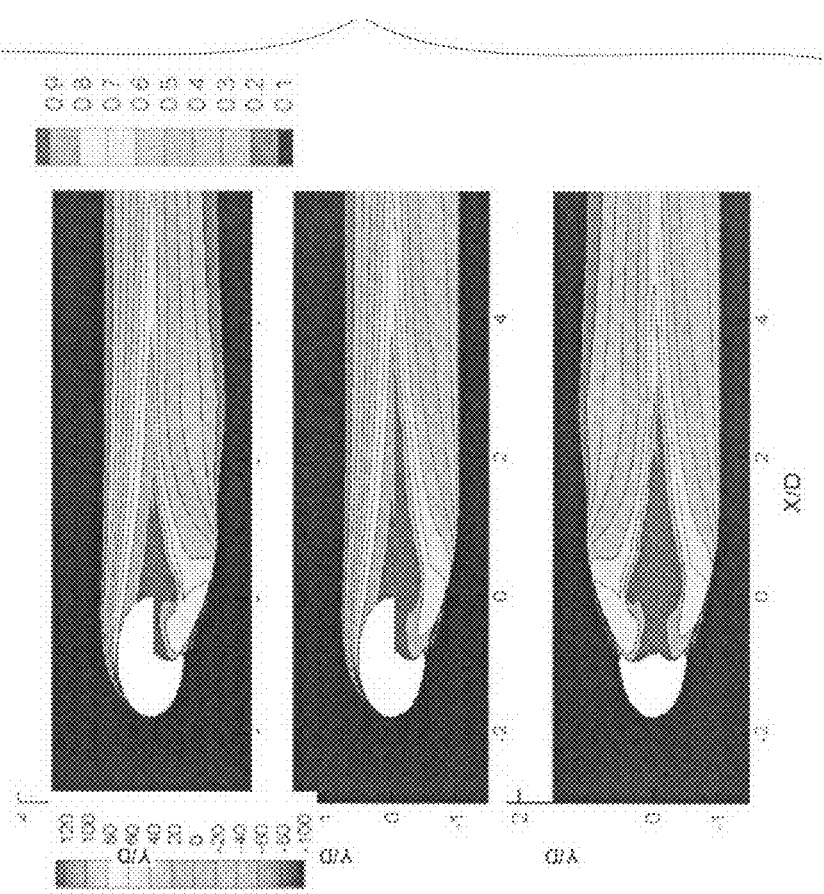
FIG. 15 compares pressure and effectiveness between the baseline and a short groove, the baseline and a long groove, and a short groove and a long groove.
Figure 15:
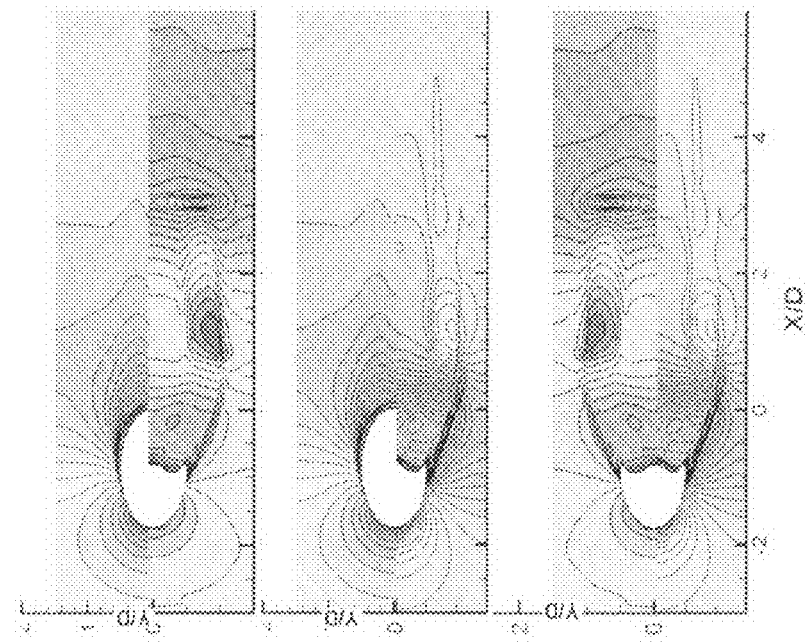
Figure 16:
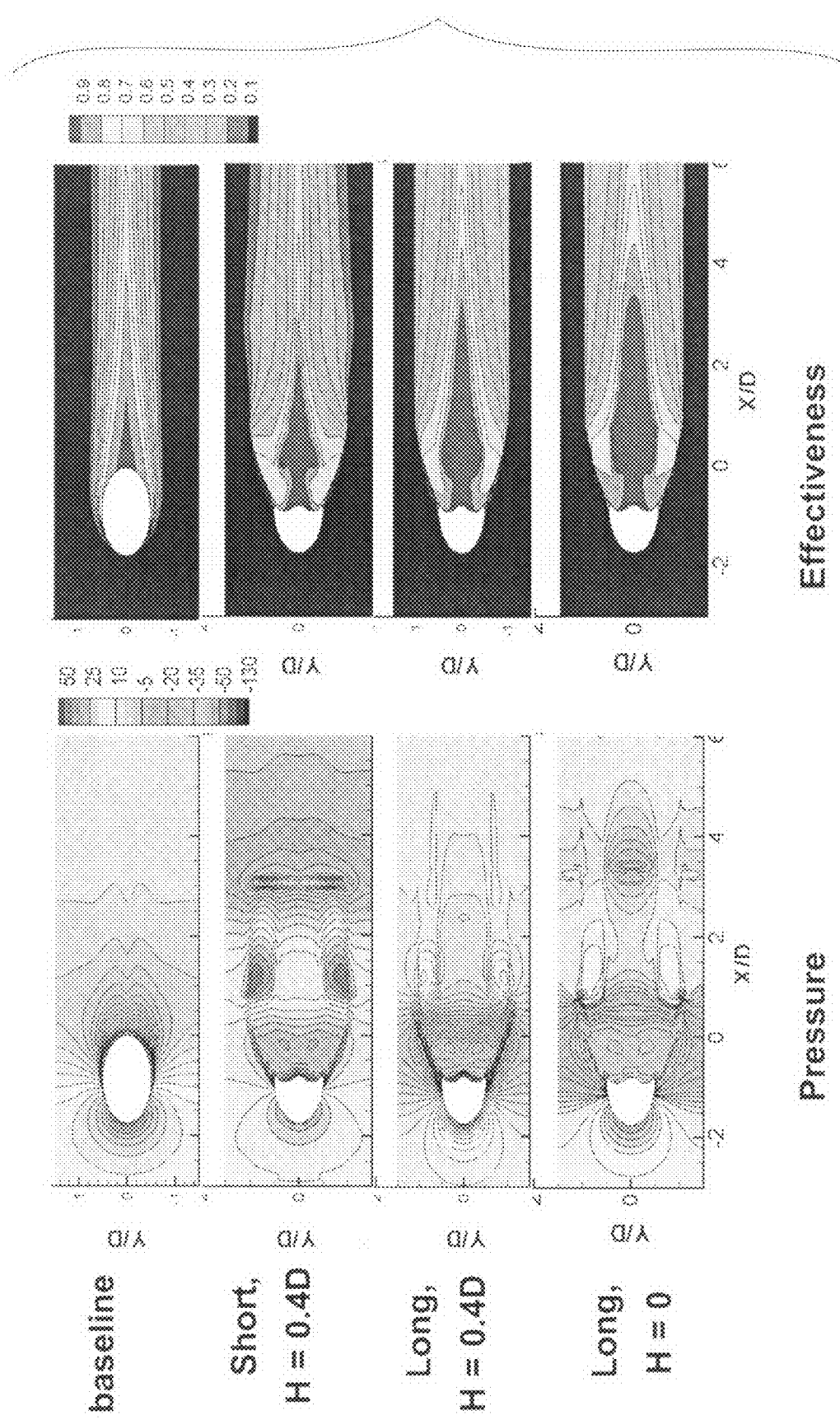
FIG. 16 provides for CFD predictions for pressure and effectiveness for the baseline case, a short w-shaped hole having a height of 0.4D, a long w-shaped hole having height of 0.4D, a long w-shaped hole having a height of 0.

FIG. 12 provides for computational fluid dynamics (CFD) predictions for the baseline case, a short w-shaped hole with a height of 0.4D and a long w-shaped hole with height of 0.4D. FIG. 13 provides CFD predictions for a long hole with a height of 0.4D and a long w-shaped hole with a height of 0. Note that the effectiveness increases as momentum is preserved. FIG. 14 provides for additional CFD predictions. FIG. 15 compares pressure and effectiveness between the baseline and a short groove, the baseline and a long groove, and a short groove and a long groove. FIG. 16 provides for CFD predictions for pressure and effectiveness for the baseline case, a short w-shaped hole having a height of 0.4D, a long w-shaped hole having height of 0.4D, a long w-shaped hole having a height of 0.

Figure 17:
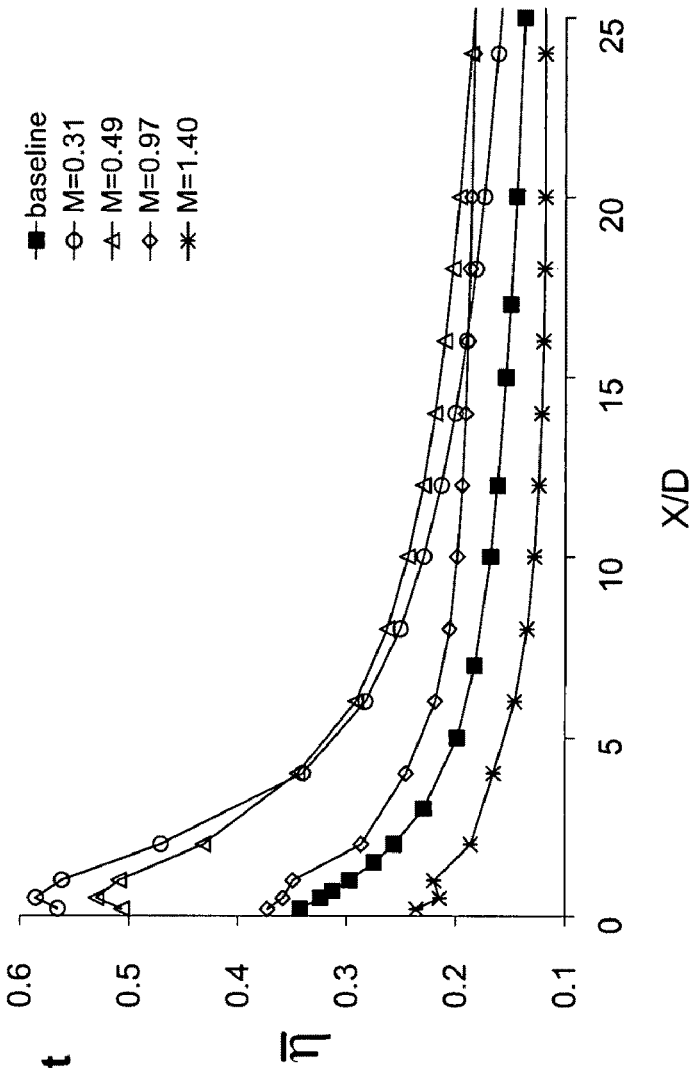
FIG. 17 illustrates CFD predictions for laterally averaged effectiveness with various mass flux rates for a long w-shaped hole having a height of 0.

FIG. 17 illustrates CFD predictions for laterally averaged effectiveness with various mass flux rates (M) for a long w-shaped hole having a height of 0. The w-shaped hole appears to be effective at low mass flux rate. Note that at M=0.97 no lift-off appears. At M=1.40, lift-off is dominant downstream of the hole exit. The baseline is no shaped holes and inlet pressure of 10.7 pa for M=0.49. With long zero height shaped holes, inlet pressures are 4.6, 6.4, 10.1, and 11.5 pa for M=0.31, 0.49, 0.97, and 1.40, respectively.

Figure 18:
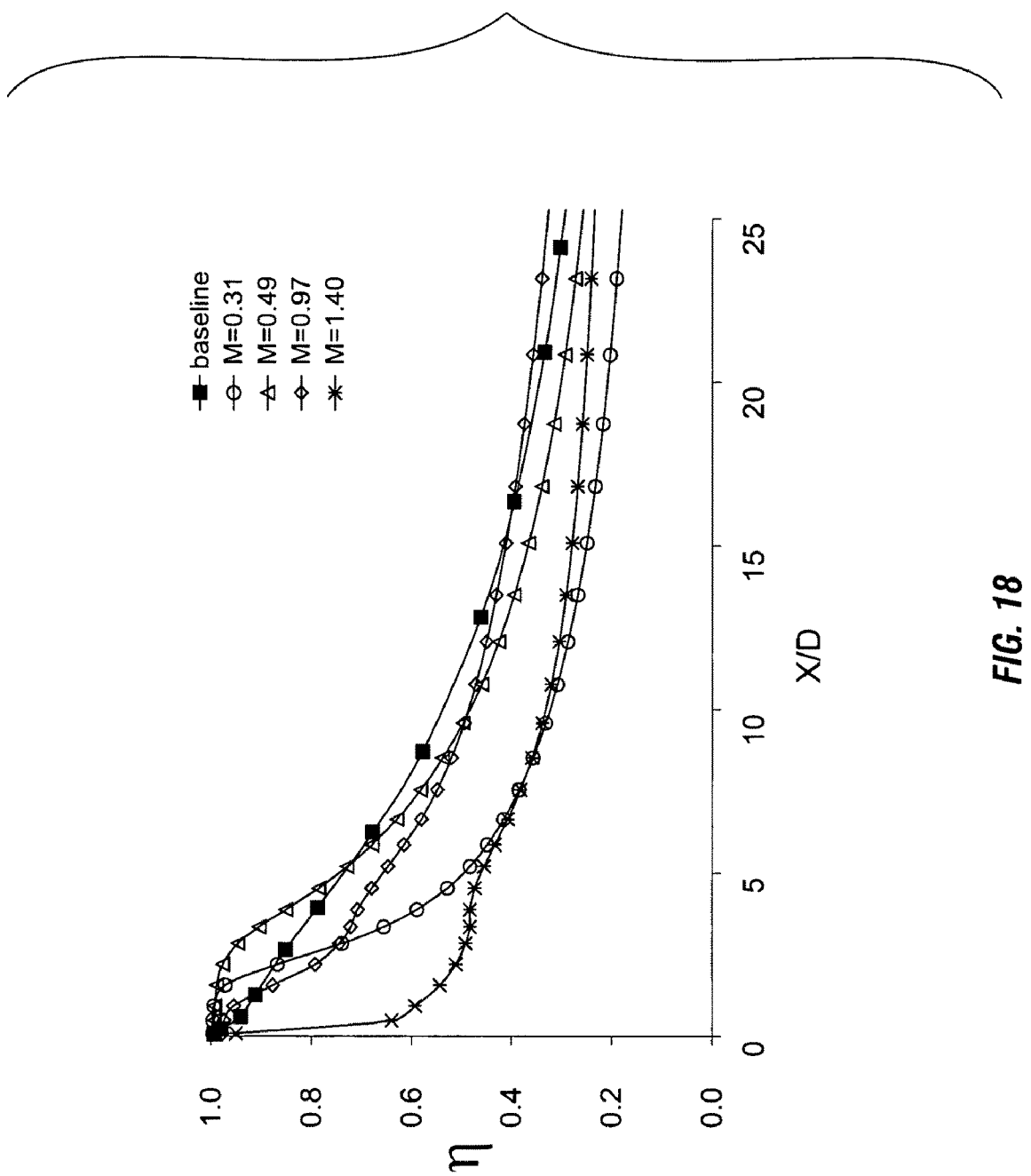
FIG. 18 illustrates CFD predictions for centerline (as opposed to laterally average) effectiveness with various mass flux rates for a long w-shaped hole having a height of 0.

FIG. 18 illustrates CFD predictions for centerline (as opposed to laterally average) effectiveness with various mass flux rates for a long w-shaped hole having a height of 0. With M=0.49 and 0.97, the centerline effectiveness is close to that of the baseline model. At M=0.31, the centerline effectiveness drops under that of the baseline due to a small amount of coolant and highly diffusing to the lateral direction through the shaped holes. At M=1.49, the centerline effectiveness drops at the exit of the hole due to lift-off.

Figure 19:
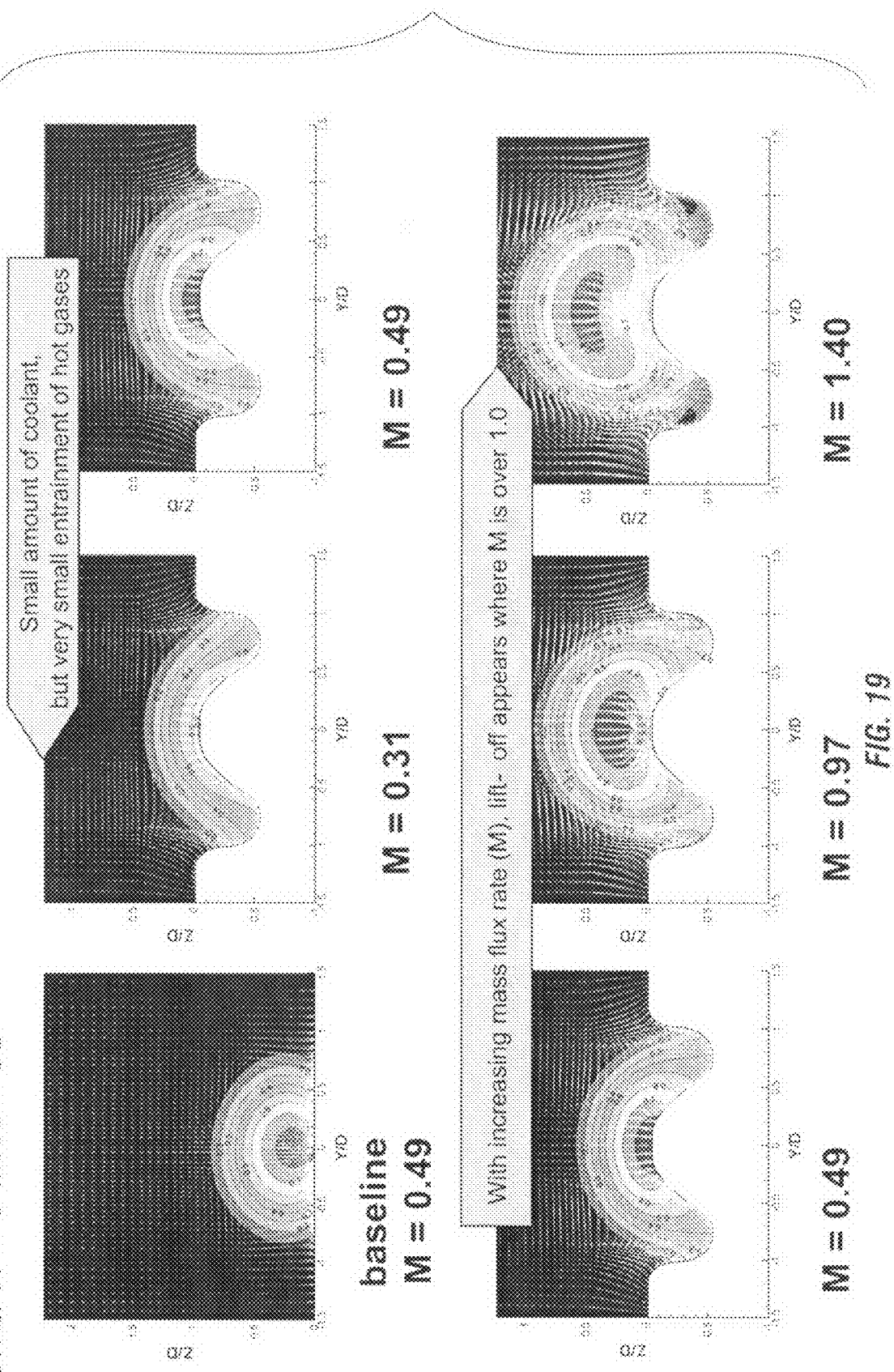
FIG. 19 illustrates w-shaped holes with the two design variations at different mass flux rates.

FIG. 19 illustrates w-shaped holes with the two design variations at different mass flux rates. Note that with M=0.31 there is a small amount of coolant but very small entrainment of hot gases. Note also that with increasing mass flux rate (M), lift-off appears where M is over 1.0.

The momentum-preserving W-shaped holes greatly increases coverage, laterally and streamwise. The long groove variation is similar to flow-aligned blockers except instead of protruding from the surface, it is a shallow trench. For the configuration studied (the present invention contemplates numerous variations), at 15D downstream of the film-cool exit, the laterally averaged effectiveness increased from 50 percent to 100 percent when compared to the baseline. The improvement in effectiveness is higher at a lower blowing ratio. Lift-off occurs at M=1.40.

Thus a method and system for cooling has been provided. The present invention contemplates numerous variations in the specific geometry and placement of the film-cooling hole, the length of the hole, the height of the hole, the inclination of the hole, the blowing ratio, the momentum flux ratio, and other variations. These and other variations are within the spirit and scope of the invention.

What is claimed is:
1. A system for cooling, comprising:
a surface to be cooled;
at least one film-cooling hole within the surface for allowing a film cooling jet of coolant to reach the surface, each of the at least one film-cooling hole having a diameter;
wherein the at least one film-cooling hole is shaped to preserve momentum of the coolant and assist in preventing entrainment of the hot gases; and
wherein each of the at least one film-cooling hole includes a w-shaped cross-section having a central point, oppo- site bottom points, and opposite ends, and wherein the hole curves downwardly and outwardly from the central point to the opposite button point and then curves upwardly to the opposite ends.

2. The system of claim 1 wherein a height of the film-cooling hole is defined by vertical distance between the central point and the opposite ends and wherein the central point does not extend above the opposite ends.

3. The system of claim 2 wherein the height is zero.

4. The system of claim 2 wherein the height is 0.4 times the diameter of the hole.

5. The system of claim 1 wherein the surface is disposed within a gas turbine.

6. The system of claim 5 wherein the surface is within a first stage stator of the gas turbine.

7. The system of claim 1 wherein each of the at least one film-cooling hole is inclined.

8. The system of claim 1 further comprising a plenum for delivering the coolant to each of the at least one film-cooling hole.

9. The system of claim 1 wherein the at least one film-cooling hole includes a plurality of film-cooling holes placed in a row.

10. An improvement to a gas turbine having a surface proximate hot gas, comprising:
   at least one film-cooling hole providing access for a film cooling jet of coolant to reach the surface to thereby form a cool film between the hot gas and the surface;
   wherein each of the at least one film-cooling hole is shaped to preserve momentum of the coolant and assist in preventing entrainment of the hot gases;
   wherein each of the at least one film-cooling hole includes a w-shaped cross-section having a central point, opposite bottom points, and opposite ends, and wherein the hole curves downwardly and outwardly from the central point to the opposite bottom points and then curves upwardly to the opposite ends.

11. The improvement to the gas turbine of claim 10 further comprising a plenum in fluid communication with the at least one film-cooling hole to deliver the coolant.

12. The improvement to the gas turbine of claim 10 wherein the at least one film-cooling hole is inclined.

13. The improvement to the gas turbine of claim 10 wherein the at least one film-cooling hole comprises a plurality of film-cooling holes organized in a row.

14. The improvement to the gas turbine of claim 1 wherein a height of the film-cooling hole is defined by vertical distance between the central point and the opposite ends and wherein the central point does not extend above the opposite ends.

15. A method of cooling a surface proximate hot gas, comprising:
   providing coolant through a w-shaped film-cooling hole to form a cool film between the hot gas and the surface, the hole having a w-shaped cross-section having a central point, opposite bottom points and opposite ends, and wherein the hole curves downwardly and outwardly from the central point;
   preserving momentum of the coolant using the w-shaped film-cooling hole to assist in preventing entrainment of the hot gases.

16. The method of claim 15 wherein the surface is disposed within a gas turbine.

17. The method of claim 15 wherein the film-cooling hole is inclined.

18. The method of claim 15 further comprising maintaining a mass flux rate which preserves lift-off of the cool film.

\* \* \* \* \*